United States Patent

US 11,879,563 B2
Mudra et al.
(45) Date of Patent: Jan. 23, 2024

(54) DRIVE DEVICE FOR ACTIVATING A ROTARY SLIDE

(71) Applicant: ECO Holding 1 GmbH, Marktheidenfeld (DE)

(72) Inventors: Alexander Mudra, Marktheidenfeld (DE); Sven Dehrmann, Wörth (DE); Jens Möhring, Nürtingen (DE)

(73) Assignee: ECO Holding 1 GMBH, Marktheidenfeld (DE)

( * ) Notice: Subject to any disclaimer, the term of this patent is extended or adjusted under 35 U.S.C. 154(b) by 0 days.

(21) Appl. No.: 17/245,513

(22) Filed: Apr. 30, 2021

(65) Prior Publication Data

US 2021/0341072 A1 Nov. 4, 2021

(30) Foreign Application Priority Data

Apr. 30, 2020 (DE) ...................... 20 2020 102 417.5

(51) Int. Cl.
*F16K 31/04* (2006.01)
*F16K 3/30* (2006.01)
*F16K 31/53* (2006.01)
*F16K 37/00* (2006.01)

(52) U.S. Cl.
CPC .............. *F16K 31/047* (2013.01); *F16K 3/30* (2013.01); *F16K 31/046* (2013.01); *F16K 31/53* (2013.01); *F16K 37/0041* (2013.01)

(58) Field of Classification Search
CPC ........ F16K 31/047; F16K 3/30; F16K 31/046; F16K 31/53; F16K 37/0041
See application file for complete search history.

(56) References Cited

U.S. PATENT DOCUMENTS

| 6,445,278 | B1 * | 9/2002 | Okumura ............. G01D 5/1655 |
| | | | 338/153 |
| 9,879,596 | B1 | 1/2018 | Bogen et al. |
| 10,125,699 | B2 * | 11/2018 | Wightman ............. H02K 29/08 |
| 2011/0039649 | A1 | 2/2011 | Tanae et al. |
| 2017/0175925 | A1 | 6/2017 | Izumi et al. |

(Continued)

FOREIGN PATENT DOCUMENTS

| CN | 102015345 A | 8/2008 |
| CN | 109268483 A | 7/2017 |

(Continued)

OTHER PUBLICATIONS

Extended European Search Report for European Application No. 21168152.3, dated Aug. 26, 2021.

*Primary Examiner* — Angelisa L. Hicks
(74) *Attorney, Agent, or Firm* — Timur Slonim, Esq; KELLER SCHNEIDER PATENT-UND MARKENANWALTE (57) ABSTRACT

The invention relates to a drive device for activating a rotary slide for a fluid system of an at least in part electrically operated motor vehicle. The drive device comprises an electric motor having a motor output shaft, a rotary slide output shaft configured for activating a rotary slide, wherein the rotary slide output shaft is aligned so as to be orthogonal to the motor output shaft, and a magnet is disposed on an end region of the rotary slide output shaft, and a sensor unit which is configured for detecting a rotary position of the magnet and thus of the rotary slide output shaft.

14 Claims, 7 Drawing Sheets

(56) References Cited

U.S. PATENT DOCUMENTS

| | | |
|---|---|---|
| 2017/0210244 A1 | 7/2017 | Isono et al. |
| 2018/0106393 A1* | 4/2018 | Laessler ................ F15B 15/202 |
| 2018/0119626 A1 | 5/2018 | Wightman et al. |
| 2019/0024786 A1 | 1/2019 | Jeon et al. |
| 2020/0336043 A1* | 10/2020 | Kume .................... H02K 7/116 |

FOREIGN PATENT DOCUMENTS

| | | | |
|---|---|---|---|
| DE | 103 28 228 A1 | 12/2004 | |
| DE | 102012202460 A1 * | 4/2013 | ......... F16H 57/0417 |
| EP | 1 043 570 A2 | 4/1999 | |

* cited by examiner

DRIVE DEVICE FOR ACTIVATING A ROTARY SLIDE

TECHNICAL FIELD

The invention relates to a drive device for activating a rotary slide for a fluid system of an at least in part electrically operated motor vehicle. The drive device comprises an electric motor having a motor output shaft, and a rotary slide output shaft configured for activating a rotary slide.

PRIOR ART

Drive devices of this type for activating rotary slides are known in general. Said drive devices are often electrically operated so as to by way of a rotary slide switch or redirect, for example, cooling liquids within so-called thermo-management modules of electrically operated vehicles. Usually, the rotary slides within specific angular positions are switched back and forth by a rotary movement of a drive device. On account thereof it is possible, for example, to redirect fluid flows or to constrict or enlarge cross sections of fluid flow ducts. Rotary slides are in most instances disposed in a rotary slide housing which in turn comprises openings for fluid to flow in or out.

Publication DE 103 28 228 A1 discloses a compact drive comprising at least one electric motor, a gearbox and an inverter, wherein the output shaft of the gearbox and the rotary shaft are disposed so as to be mutually parallel, and the axial spacing is determined at least by a spur gear stage of the gearbox or by the embodiment of an adjusting gearbox.

In the prior art it is problematic on the one hand that the precise establishment of the angular or rotary position of a rotary slide of this type can only be implemented by complex and cost-intensive measurement technology. Moreover, there are often strict customer requirements in terms of the compactness and installation space of drive devices of this type and of the rotary slide.

It is furthermore disadvantageous that the construction of the drive devices known from the prior art is extremely complex. This level of complexity inevitably also leads to a simple replacement of individual parts of drive devices of this type being impossible. Instead, the drive devices are simply completely interchanged, on account of which there is an additional sensitivity in terms of costs.

SUMMARY OF THE INVENTION

It is an object of the invention to create a drive device which is associated with the technical field mentioned at the outset and which overcomes the abovementioned disadvantages in the prior art. It is in particular an object of the present invention to specify a drive device which is configured so as to be particularly flat, or have a small installation height, respectively. It is furthermore an object of the present invention to specify a drive device which, despite the compact configuration thereof, enables an ideally precise and efficient detection of the angular or rotary position of the assigned rotary slide.

The achievement of the object is defined by the features of Claim 1. According to the invention, the drive device for activating a rotary slide for a fluid system of an at least in part electrically operated motor vehicle has an electric motor having a motor output shaft, and a rotary slide output shaft configured for activating a rotary slide. Moreover, the rotary slide output shaft is aligned so as to be orthogonal to the motor output shaft, and a magnet is disposed on an end region of the rotary slide output shaft. The drive device additionally comprises a sensor unit which is configured for detecting a rotary position of the magnet and thus of the rotary slide output shaft.

The technical advantage that the drive device can be configured in a particularly compact manner results on account thereof, for example. A comparatively high rotating speed at an overall minor starting torque results by virtue of the electric motor. On account of the disposal of the electric motor and the gearbox it is possible for a suitable gearing with a reduced rotating speed and an increased starting torque to be achieved in association with a small, in particular very flat, installation space. For example, a gearing ratio of 1:24 can be achieved on account of the gearbox. Alternatively however, a higher or lower gearing ratio such as, for example, 1:10, 1:20, 1:30, etc. can also be implemented.

On account of the increased starting torque it is additionally possible for the issue of a "sticky" drive device that often arises after comparatively long stationary periods to be overcome. A lower torque is then in turn sufficient during the operation of the drive device. Overall, a particularly small or flat, respectively, installation space of the drive device is achieved in order for a suitable gearing ratio with a reduced rotating speed and an increased starting torque to be implemented.

According to one advantageous embodiment, the sensor unit is disposed so as to be axially spaced apart from the face-proximal end of the rotary slide output shaft. The technical advantage that the magnetic field lines are particularly precisely detected by the sensor unit and are available for determining the rotary position of the rotary slide output shaft and of the rotary slide connected thereto is achieved on account thereof, for example. The axial disposal directly on the rotary slide output shaft facilitates the determination of the rotary position of the rotary slide output shaft. Consequently, comparatively simple and thus cost-effective sensor units can be used.

In order for an ideally simple and compact construction mode of the drive device to be implemented, the sensor unit is disposed on a control unit. For example, the control unit is disposed so as to be orthogonal to the end of the rotary slide output shaft and so as to be proximal to the face of said end. The sensor unit on the control unit is preferably disposed on a circuit board. The sensor unit, the control unit and the circuit board can jointly can also be referred to as the control unit.

According to one further embodiment, the rotary slide output shaft is held by means of a housing-proximal bearing. The technical advantage that the assembly of the drive device can be simplified is achieved on account thereof, for example. For example, the housing-proximal bearing can be disposed on a removable housing cover of the housing. This facilitates the assembly and the access to the component parts of the drive device.

According to one particular embodiment, the control unit is disposed between the face-proximal end of the rotary slide output shaft and the housing-proximal bearing. The technical advantage that a particularly compact construction mode of the drive device is possible is achieved on account thereof, for example. Based on the previous embodiment, the housing-proximal bearing can be disposed on a removable housing cover of the housing, for example. On account thereof, direct access to the control unit can be gained by removing the housing cover.

In order for the compact and flat construction mode of the drive device to be implemented in an ideally simple and functionally reliable manner, the drive device has a gearbox for transmitting a torque of the motor output shaft to the rotary slide output shaft, wherein a first gear wheel axle and a second gear wheel axle of the gearbox are disposed so as to be mutually parallel, and the rotary slide output shaft comprises the first gear wheel axle. In conjunction with the fact that the first gear wheel axle and the second gear wheel axle at the ends thereof are mounted directly in the housing, the technical advantage that the housing can be produced in a particularly simple manner by the injection-molding method is achieved, for example. A particularly simple demolding capability is provided here. For example, the motor output shaft is connected to the gearbox by means of a worm gear. This offers the additional advantage of a silent operation. The gearbox comprises a dual-stage spur gear, for example.

According to one particularly advantageous embodiment, the housing-proximal bearing for holding the rotary slide output shaft is configured so as to be tongue-shaped, wherein the tongue-shaped bearing is disposed substantially on a side of the first gear wheel axle that faces away from the second gear wheel axle.

In principle, two mutually meshing gear wheels have the characteristic that said gear wheels when in operation each generate a force that points radially away from the respective other force. In other words, an asymmetrical bearing load is generated during the operation of two mutually meshing gear wheels. On account of the tongue-shaped configuration of the bearing, only that side of the bearing at which the load arises is supported. The tongue-shaped bearing can also be referred to as the wall of a partial cylinder or a partial tubular wall. Consequently, the rotary slide output shaft has to be only unilaterally mounted, this facilitating the assembly of the drive device.

According to one additional embodiment, the housing-proximal bearing for holding the rotary slide output shaft extends through a contour of the control unit. The technical advantage that the compactness of the drive device is additionally increased is achieved on account thereof, for example. A further advantage lies in the fact that the mechanical load acting on the mounting and the vibrations associated therewith are completely decoupled from the axial measurement of the rotary position by the magnetic field lines of the magnet. The axial disposal directly on the rotary slide output shaft facilitates the precise determination of the rotary position of the rotary slide output shaft without the influences due to inaccuracies of the loaded bearing. Consequently, comparatively simple and thus cost-effective sensor units can be used.

In order to enable an ideally flat construction mode of the drive device, the electric motor is configured as a brushless stepper motor having axially disposed coils. Stepper motors of this type achieve twenty full steps per revolution, are able to be actuated in a bipolar manner and have a rotor which is magnetized in a striped pattern. The axial disposal of the phase coils in relation to the rotor enables a particularly small diameter of the electric motor, or of an associated motor assembly, respectively. The profile of the field herein runs radially through the rotor, from an internal stator to an external stator. On account thereof, the electric motor is able to be integrated directly so as to lie flat in the drive device, or a corresponding support assembly, respectively. The electric motor, or stepper motor, respectively, moreover offers a particularly high rotating speed at a low moment of inertia.

For example, the stepper motor has a diameter of at most 25 mm, of at most 20 mm, of at most 15 mm or less. By virtue of the fact that the stepper motor is disposed so as to lie flat in the housing of the drive device, in other words the motor output shaft is disposed so as to be orthogonal to the rotary slide output shaft, an installation height of the housing of the drive device can be 25 mm or less. In order to be able to ensure a sufficient output at the rotary slide output shaft despite the small diameter of the stepper motor, the stepper motor has an output of at least 20 Nmm at a rotating speed of 2000 rpm. On account thereof, an overall particularly flat and compact housing which by virtue of a small number of components has a small volume and a low weight can be implemented.

According to one particularly preferred embodiment, the sensor unit has a 3D Hall sensor. The technical advantage that comparatively cost-effective sensor units with a high quality in terms of measurement can be used is achieved on account thereof, for example.

According to one further embodiment, the control unit is disposed so as to be orthogonal to the first gear wheel axle and to the second gear wheel axle. The technical advantage that the compact and flat construction mode of the drive device can be implemented in a simple manner is achieved on account thereof, for example. Additionally, the assembly can take place in a particularly simple manner since the first gear wheel axle and the second gear wheel axles are aligned so as to be mutually parallel and disposed directly below the control unit.

Proceeding from the preceding embodiments, the housing-proximal bearing can be disposed on a removable housing cover of the housing, for example. On account thereof, direct access to the control unit can be obtained by removing the housing cover, and direct access can be obtained to the gearbox and the first gear wheel axle and the second gear wheel axle by removing the control unit.

In order for the entire drive device including the control unit to be protected in relation to moisture and mechanical load in the housing, the drive device and the control unit are disposed in a fluidically sealed housing.

According to one further embodiment, the housing has a bulkhead for fluidically sealing the control unit and the electric motor in relation to a housing portion that is able to be passed through by a fluid flow. The technical advantage that the housing is divided into a dry region and a wet region is achieved on account thereof, for example. The control unit and the stator are thus protected from contact with fluid, for example. This enhances the reliability of the drive device.

In one advantageous embodiment of the invention, the drive device comprises an interface for connecting to an external control apparatus. The technical advantage that customer-specific control apparatuses can be used for activating the drive device is achieved on account thereof, for example. For example, the internal control apparatus can be bypassed or deactivated when an external control apparatus is connected. On account thereof, the drive device is rendered so as to be able to be utilized in a particularly flexible manner for different customer vehicles and different customer requirements.

Proceeding therefrom, the housing preferably has a plug connector for receiving the interface. The technical advantage that the flexibly usable interface is protected in relation to external influences is achieved, for example. Apart from the protection in relation to moisture and contamination, mechanical fastening to an external control apparatus can take place by means of the plug connector, the interface being secured on account thereof. The functioning and the reliability of the drive device are additionally improved on account thereof.

According to an additional embodiment, the gearbox is configured for wet running. The technical advantage that the gearbox can be disposed completely in the wet region of the drive device is achieved on account thereof, for example. For example, the entire gearbox can be produced from plastics material. On account thereof, it is additionally possible for the drive device to be produced in a particularly cost-effective manner.

An alternative variant comprises a drive device for activating a rotary slide for a fluid system of an at least in part electrically operated motor vehicle, having an electric motor having a motor output shaft, a gearbox having at least two speeds for transmitting a torque of the motor output shaft to a rotary slide output shaft configured for activating a rotary slide valve. The gearbox has a gearbox input shaft which is disposed so as to be orthogonal to the motor output shaft, wherein the rotary slide output shaft is disposed so as to be orthogonal to the gearbox input shaft.

The technical advantage that the drive device can be configured in a particularly compact manner results on account thereof, for example. A comparatively high rotating speed at an overall low starting torque results by virtue of the electric motor. On account of the disposal of the electric motor and the gearbox it is possible for a suitable gearing with a reduced rotating speed and an increased starting torque to be achieved in association with a small, in particular very flat, installation space. For example, a gearing ratio of 1:24 can be achieved on account of the gearbox. Alternatively however, a higher or lower gearing ratio such as, for example, 1:10, 1:20, 1:30, etc. can also be implemented. On account of the increased starting torque it is additionally possible for the issue of a "sticky" drive device that often arises after comparatively long stationary periods to be overcome. A lower torque is then in turn sufficient during the operation of the drive device.

According to one advantageous refinement, the rotary slide output shaft is disposed so as to be orthogonal to the motor output shaft. A particularly small or flat, respectively, installation space of the drive device is ensured on account thereof, so as to achieve a suitable gearing ratio at a reduced rotating speed and an increased starting torque.

According to one further embodiment, the electric motor is configured as a stepper motor, in particular as an inductor motor. The electric motor is particularly preferably an axial inductor stepper motor having actually disposed phase coils. Such an axial inductor stepper motor achieves twenty full steps per rotation, is able to be actuated in a bipolar manner and has a rotor which is magnetized in a striped pattern. The axial disposal of the phase coils in relation to the rotor enables a particularly small diameter of the electric motor, or of an associated motor assembly, respectively. The profile of the field herein runs radially through the rotor, from an internal stator to an external stator. On account thereof, the electric motor is able to be integrated directly so as to lie flat in the drive device, or a corresponding support assembly, respectively. The electric motor, or stepper motor, respectively, moreover offers a particularly high rotating speed at a low moment of inertia.

According to one particular embodiment, the motor output shaft and the gearbox input shaft are configured so as to be connected by means of the first bevel gear. The bevel gear enables a very simple and space-saving redirection of the torque of the electric motor to a direction which is different from that of the motor output shaft and is in particular orthogonal to the latter.

According to an additional refinement, the gearbox has a gearbox output shaft which is configured so as to be connected to the rotary slide output shaft by means of a second bevel gear. The bevel gear here enables a very simple and space-saving redirection of the torque of the gearbox output shaft to a direction which is different from that of the gearbox output shaft and is in particular orthogonal to the latter. The gearbox output shaft herein is preferably configured so as to be parallel to the gearbox input shaft. The flat installation space of the drive device becomes achievable in a particularly simple manner in this way.

Moreover, the first and/or the second bevel gear can be configured as a worm gear in order for the respective torque to be redirected. Similar advantages are derived.

According to one particularly advantageous embodiment, the gearbox comprises a multi-speed spur gear set which is disposed between the gearbox input shaft and the gearbox output shaft. The technical advantage that a particularly flexible implementation of the torque of the electric motor can take place in a limited installation space is achieved on account thereof, for example.

According to one further embodiment, the radial extent of a largest gear wheel of the spur gear set is smaller than or equal to a diameter of the electric motor. The technical advantage that the installation height of the electric motor can be restricted, and the overall extent of the drive device thus minimized is achieved on account thereof, for example.

For example, the rotary slide output shaft has a magnet for detecting a rotary position of the rotary slide output shaft. The magnet herein is preferably disposed so as to be asymmetrical in relation to a rotation axis R of the rotary slide output shaft. The technical advantage that a corresponding asymmetry of the magnetic field lines is created is achieved on account thereof, for example. For example, the magnet is disposed so as to be eccentric on the rotary slide output shaft.

According to an additional refinement, the magnet is assigned a sensor unit for detecting an angular position of the rotary slide output shaft. The technical advantage that the magnetic field lines are detected by the sensor unit and are available for determining the rotary position of the rotary slide output shaft and the rotary slide connected thereto is achieved on account thereof, for example.

According to one further embodiment, the drive device has a control unit which is disposed so as to be parallel to a plane that is predefined by the motor output shaft and the gearbox input shaft. The technical advantage that the positioning of the rotary slide output shaft and thus the rotary position of the rotary slide can be determined by actuating the gearbox is achieved on account thereof, for example. For example, the control unit in axial terms is disposed behind the end of the rotary slide output shaft. Moreover, the sensor unit conjointly with the control unit is preferably disposed on a circuit board. The sensor unit, the control unit and the circuit board can jointly can also be referred to as the control unit.

According to one particularly advantageous embodiment, the circuit board and the spur gear set are disposed in such a manner that the smallest common extent thereof is smaller than or equal to the diameter of the electric motor. The technical advantage that the minimum installation height of the drive device established by the diameter of the electric motor is not exceeded is achieved on account thereof, for example. When required, the circuit board herein has a clearance for a gear wheel of the gearbox should there be insufficient installation space available for this gear wheel without this clearance.

According to one further embodiment, the drive device and the control unit are disposed in a fluidically sealed housing. The technical advantage that the entire drive device including the control unit are protected in relation to moisture and mechanical load in the housing is achieved on account thereof, for example.

The drive device advantageously comprises an interface for connecting to an external control apparatus. The technical advantage that customer-specific control apparatuses can be used for activating the drive device is achieved on account thereof, for example. For example, the internal control apparatus can be bypassed or deactivated when an external control apparatus is connected.

The drive device can as a result be used particularly flexibly for different customer vehicles and different customer requirements.

Proceeding therefrom, the housing preferably has a plug connector for receiving the interface. The technical advantage that the flexibly usable interface is protected in relation to external influences is achieved on account thereof, for example. Apart from the protection in relation to moisture and contamination, mechanical fastening to an external control apparatus can take place by means of the plug connector, the interface being secured on account thereof. The functioning and the reliability of the drive device are additionally improved on account thereof.

According to one further embodiment, the housing has a bulkhead for fluidically sealing the control unit and the electric motor in relation to a housing portion that is able to be passed through by a fluid flow. The technical advantage that the housing is divided into a dry region and a wet region is achieved on account thereof, for example. The control unit and the stator are thus protected from contact with fluid, for example. This enhances the reliability of the drive device.

According to a particular refinement, the gearbox is configured for wet running. The technical advantage that the gearbox can be disposed completely in the wet region of the drive device is achieved on account thereof, for example. For example, the entire gearbox can be produced from plastics material. On account thereof, it is additionally possible for the drive device to be produced in a particularly cost-effective manner.

Further advantageous embodiments and combinations of features of the invention are derived from the detailed description hereunder and from the entirety of the patent claims.

BRIEF DESCRIPTION OF THE DRAWINGS

In the drawings used for explaining the exemplary embodiment.

In principle, identical parts are provided with the same reference signs in the figures.

WAYS OF IMPLEMENTING THE INVENTION

Figure 1:
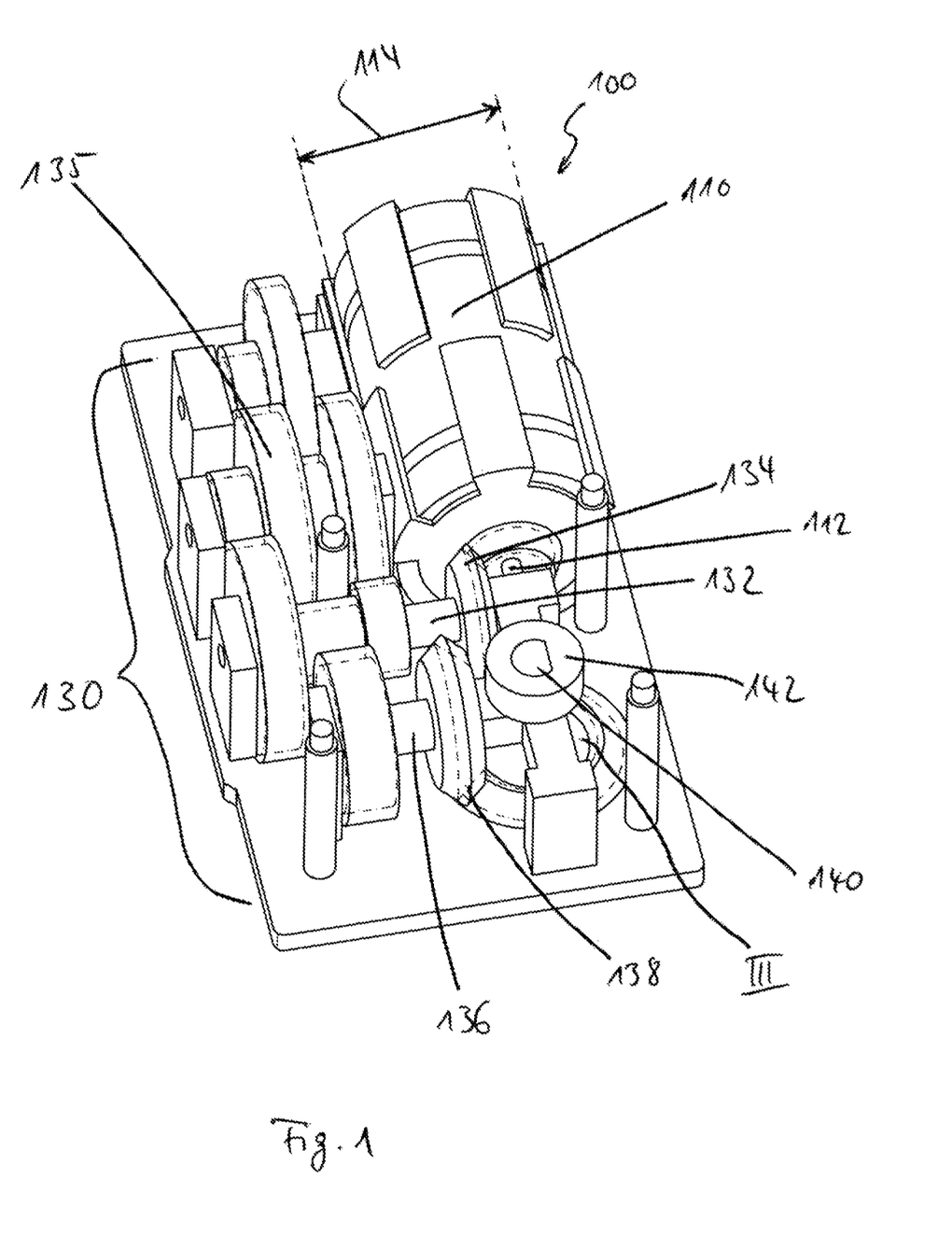
FIG. 1 shows a perspective partial view of a drive device.

FIG. 1 shows a perspective partial view of a drive device 100 according to the invention for activating a rotary slide for a fluid system of an at least in part electrically operated motor vehicle. The drive device 100 has an electric motor 110 from which a motor output shaft 112 extends. The electric motor 110 has a cylindrical basic shape with a diameter 114. Moreover, the drive device 100 has a gearbox 130 which connects the motor output shaft 112 to the rotary slide output shaft 140. The gearbox 130 comprises a gearbox input shaft 132 which by means of a first bevel gear 134 is connected to the motor output shaft 112. The gearbox 130 furthermore comprises a spur gear set 135 which is connected to the gearbox input shaft 132 and a gearbox output shaft 136 which is disposed in parallel. The spur gear set 135 comprises a plurality of gear wheel speeds so as to transmit a comparatively high rotating speed of the electric motor 110 at a low torque to a lower rotating speed of the rotary slide output shaft 140 at an increased torque. The gearbox 130 is connected to the rotary slide output shaft 140 by way of the gearbox output shaft 136 and a second bevel gear 138 which is likewise associated with the gearbox 130.

The electric motor 110 here is configured as an inductor stepper motor. In order for the installation height of the drive device 100 to be kept ideally small, the radial extent of the largest gear wheel of the spur gear set 135 is smaller than or equal to the diameter 114 of the electric motor 110. The gear input shaft 132 of the gearbox 130 is disposed so as to be orthogonal to the motor output shaft 112. The rotary slide output shaft 140 is disposed so as to be orthogonal to the gearbox input shaft 132 as well as to the gearbox output shaft 136. A magnet 142, the rotary position thereof being able to be detected by a sensor unit 152 (not shown), is situated at one end of the rotary slide output shaft 140.

Figure 2:
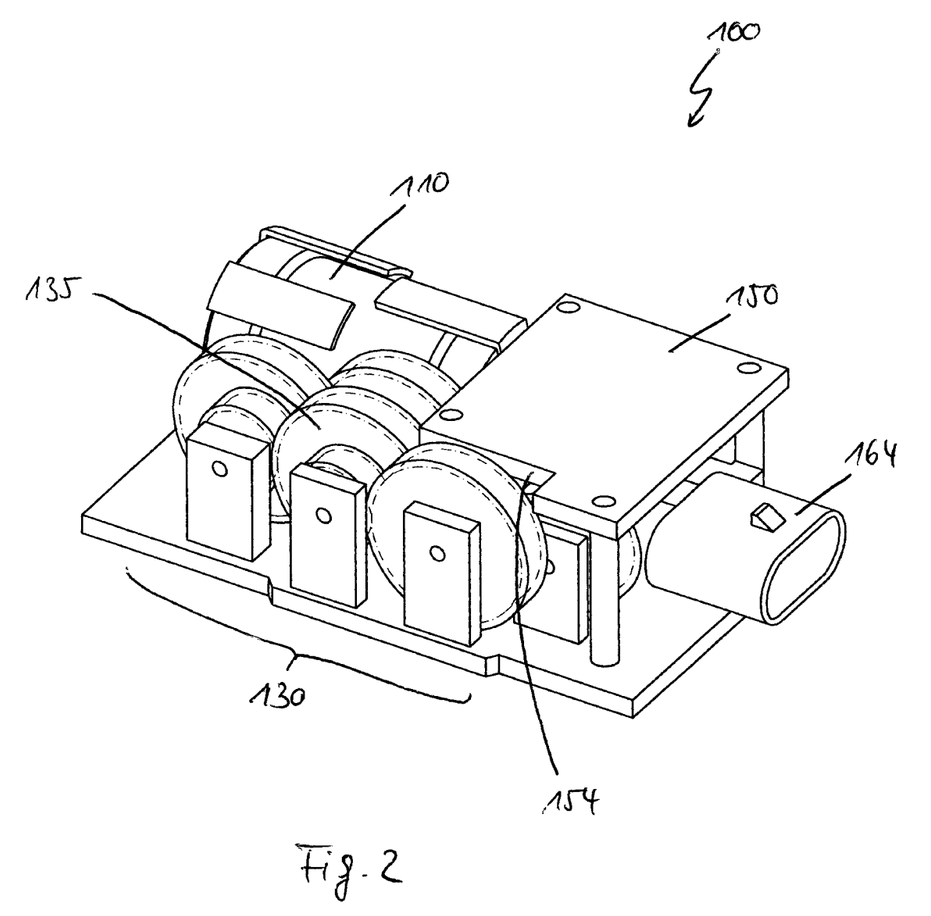
FIG. 2 shows a perspective partial view of the drive device from FIG. 1, having a control unit and a plug connector.

FIG. 2 shows an expanded partial view of the drive device 100 according to the invention. Components of the drive device 100 known from FIG. 1 are the electric motor 110 and the gearbox 130 having the spur gear set 135. Additionally, the drive device 100 has a control unit 150 having a sensor unit 152 (not illustrated). The sensor unit 152 is preferably disposed directly above the magnet 142. The control unit 150 herein is connected to a plug connector 164 by means of an interface 162 (not shown). Moreover, the control unit 150 is disposed so as to be parallel to a plane which is predefined by the motor output shaft 112 (see FIG. 1) and the gearbox input shaft 132 (see FIG. 1). The control unit 150 comprises a clearance 154 so as to dispose the control unit 150 at an ideally flat height on the drive device 100.

Figure 3:
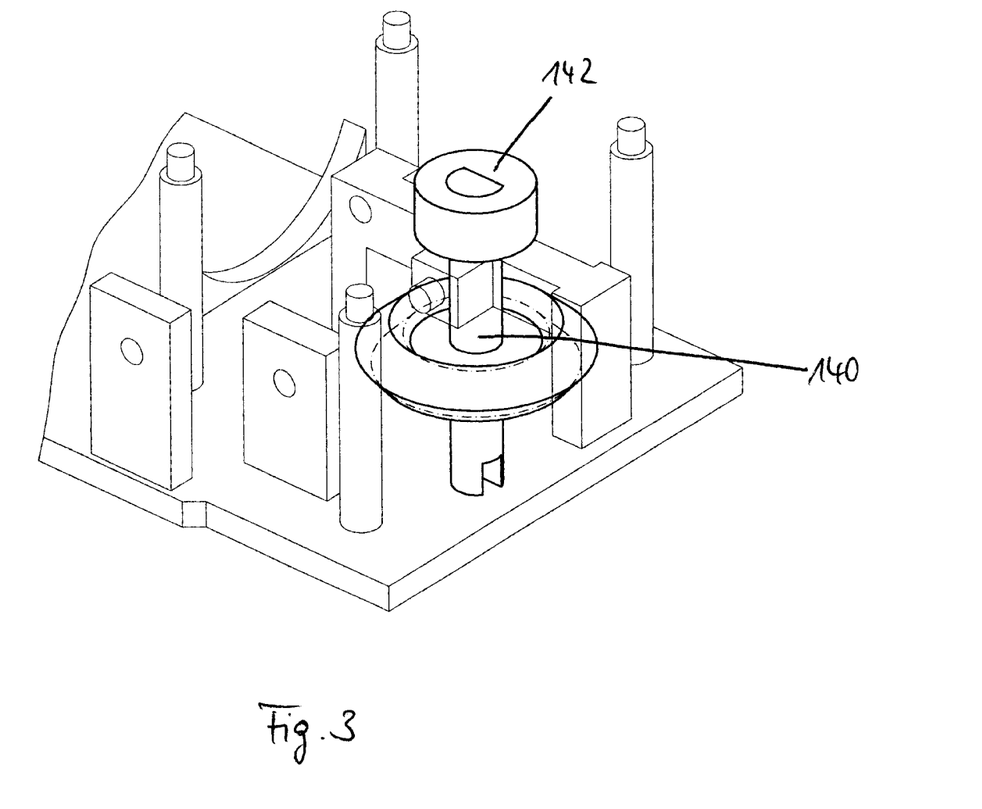
FIG. 3 shows a perspective lateral view of the detail III from FIG. 1.

FIG. 3 shows a partial view of the drive device 100 according to the invention in which the rotary slide output shaft 140 can be seen. The rotary slide output shaft 140 has the magnet 142, the rotary position thereof being able to be detected by the sensor unit 152 mentioned in the context of FIG. 2, so as to detect an angular position of the rotary slide output shaft 140. It is thus overall possible for the current rotary position of the rotary slide (not shown) to be detected and controlled.

Figure 4:
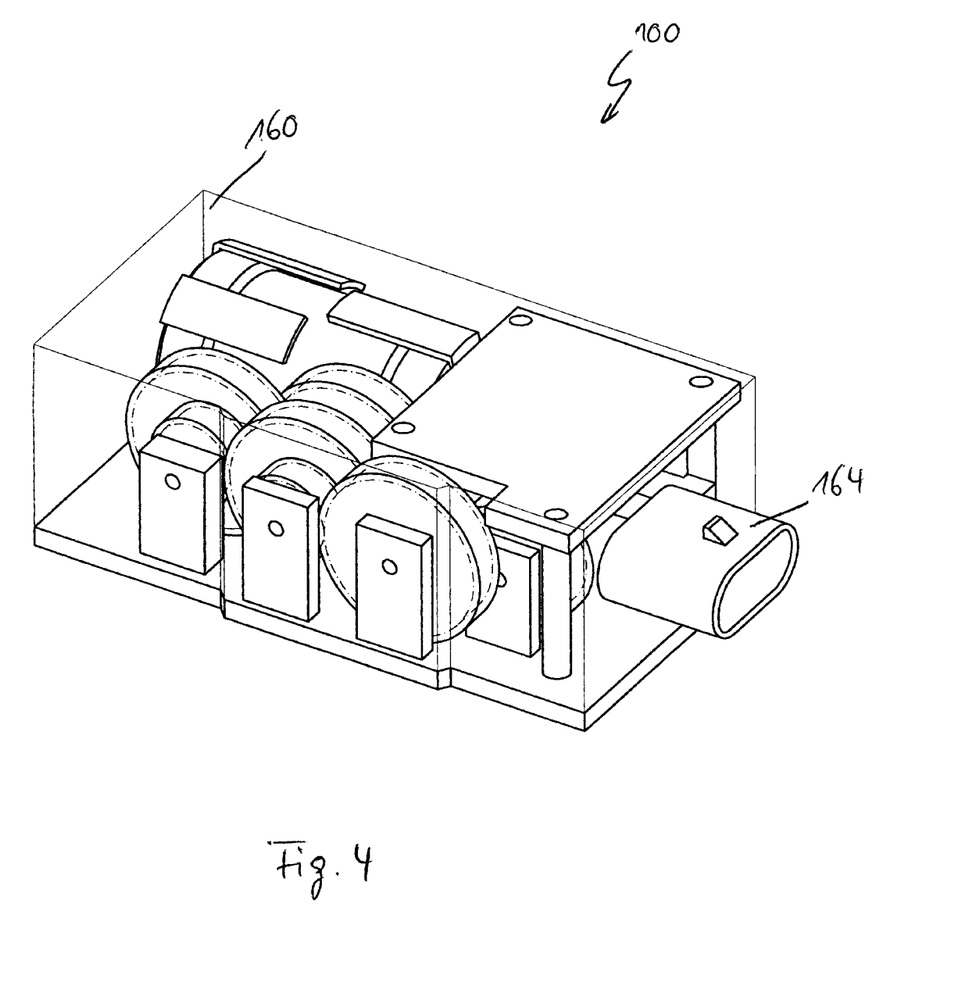
FIG. 4 shows the partial view of FIG. 2, having an indicated rotary slide housing.

FIG. 4 shows the partial view from FIG. 2, additionally having an indicated housing 160 which encloses the drive device 100. All components from FIG. 2 are thus also illustrated here. The drive device 100 conjointly with the control unit 150 are disposed so as to be fluidically sealed in the housing 160. The housing 160 can moreover have a bulkhead so as to fluidically separate the control unit 150 and the electric motor 110 from a housing portion that is able to be passed through by a fluid flow, for example when the gearbox 130 is configured for wet running.

Figure 5:
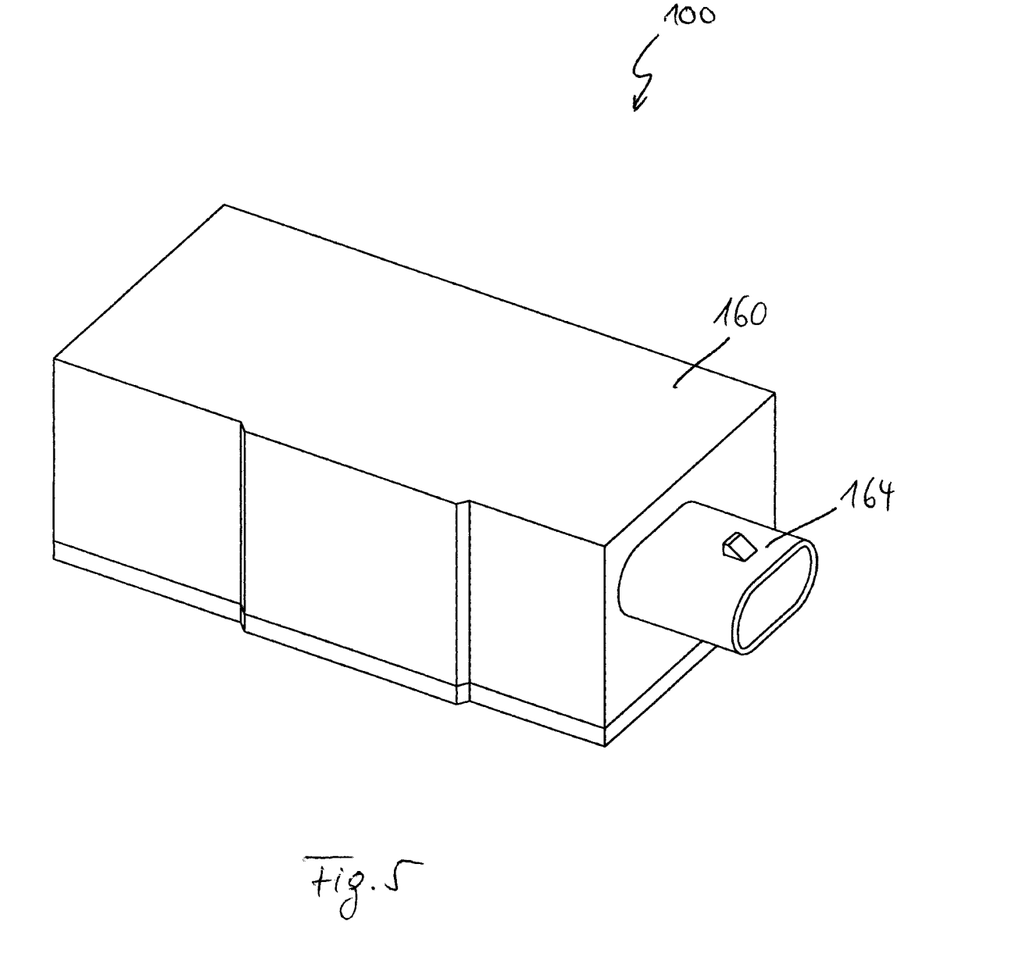
FIG. 5 shows a perspective lateral view of the rotary slide housing.

FIG. 5 shows the housing 160 having the externally disposed plug connector 164. Manifold individual aspects of the drive device 100 have in particular been described in the description. The individual aspects herein may be claimed individually and independently of other aspects.

Figure 6:
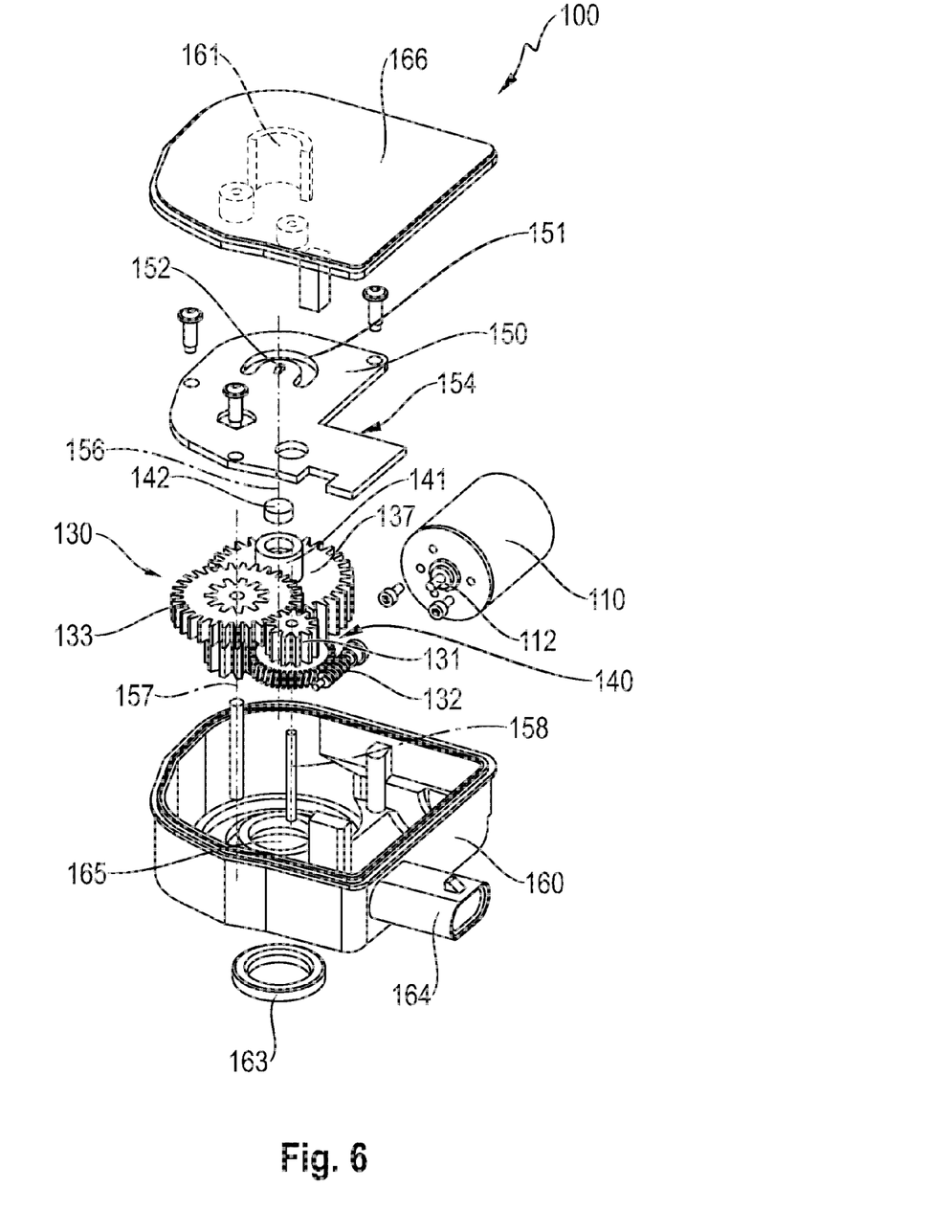
FIG. 6 shows an exploded illustration of an embodiment according to the invention.

FIG. 6 shows an exploded illustration of an embodiment according to the invention of a drive device 100.

The drive device 100 has an electric motor 110 in the form of a brushless stepper motor. The electric motor 110 lies flat in a fluidically sealed housing 160 and is disposed in a space-saving manner beside a gearbox 130 for transmitting a torque of a motor output shaft 112 to a rotary slide output shaft 140. The motor output shaft 112 is connected to the gearbox 130 by means of a gearbox input shaft 132 in the form of a worm gear.

The rotary slide output shaft 140 is aligned so as to be orthogonal to the motor output shaft 112, on account of which a particularly flat construction mode of the drive device 110 is possible.

A magnet 142 is disposed so as to be centric on an end region 141 of the rotary slide output shaft 140 so as to detect a rotary position of the magnet 142 and thus of the rotary slide output shaft 140 with the aid of a sensor unit 152. The sensor unit 152 is axially spaced apart from the face-proximal end of the rotary slide output shaft 140 so as to enable precise measuring. To this end, the sensor unit 152 on the magnet 142 is disposed directly above the end region 141 of the rotary slide output shaft 140.

The gearbox 130 in addition to the gearbox input shaft 132 possesses three further gear wheels 131, 133, 137, the gear wheel axles 156, 157, 158 thereof being aligned so as to be mutually parallel. The motor output shaft 112 is connected to the third gear wheel 131 by means of the gearbox input shaft 132. The torque of the electric motor 110 herein is transmitted to the third gear wheel 131 by way of the worm gear, the third gear wheel axle 158 of said third gear wheel 131 being configured so as to be orthogonal to the motor output shaft 112.

The third gear wheel 131 is connected to the second gear wheel 133, wherein the second gear wheel axle 157 is assigned to the second gear wheel 133. The second gear wheel 133 is connected to the first gear wheel 137, wherein the first gear wheel axle 156 is assigned to the first gear wheel 137. The rotary slide output shaft 140 is connected to the first gear wheel 137 and at an upper end supports the magnet 142 so as to detect the rotary position of the magnet 142 and thus of the rotary slide output shaft 140 with the aid of the sensor unit 152. A rotary slide (not shown) can be disposed on the lower end of the first gear wheel 137 so as to switch said rotary slide back and forth between specific angular positions. The rotary slide output shaft 140 herein is guided through a housing opening 165. Additionally, the first gear wheel 137 is guided in relation to the housing opening 165 by means of a radial sealing element 163.

A plug connector 164 which has an interface 162 (not shown) for connecting to an external control apparatus is situated laterally on the housing 160.

A control unit 150 the form of a circuit board which supports the sensor unit 152 exactly above the magnet 152 is situated above the gearbox 130. A clearance 154 of the control unit 150 offers a construction mode which is spatially optimized and compact, because the control unit 150 and the electric motor 110 can be disposed closer beside one another and the spacing between the control unit 150 and the face-proximal end of the gear wheels 137, 133, 131 can be additionally reduced.

A housing cover 166 which has a housing-proximal bearing 161 for holding the rotary slide output shaft 140 is shown above the control unit 150. The housing-proximal bearing 161 for holding the rotary slide output shaft 140 is configured so as to be tongue-shaped or as a wall of a partial cylinder. An asymmetrical bearing load during the operation of two mutually meshing gear wheels is absorbed on account of the tongue-shaped configuration of the housing-proximal bearing 161. The asymmetrical bearing load is created in that two mutually meshing gear wheels, here the first gear wheel 137 and the second gear wheel 133, when in operation each have the characteristic of generating a force that points radially away from the respective other force. The tongue-shaped configuration of the bearing is used only on that side that arises by virtue of the occurring load. The rotary slide output shaft 140 is thus only unilaterally mounted, this facilitating the assembly of the drive device 100.

The control unit 150 is disposed between the face-proximal end of the rotary slide output shaft 140 and the housing cover 166. In order for the housing-proximal bearing 161 to be able to hold the rotary slide output shaft 140, the latter is guided through a contour 151 of the control unit 150.

Figure 7:
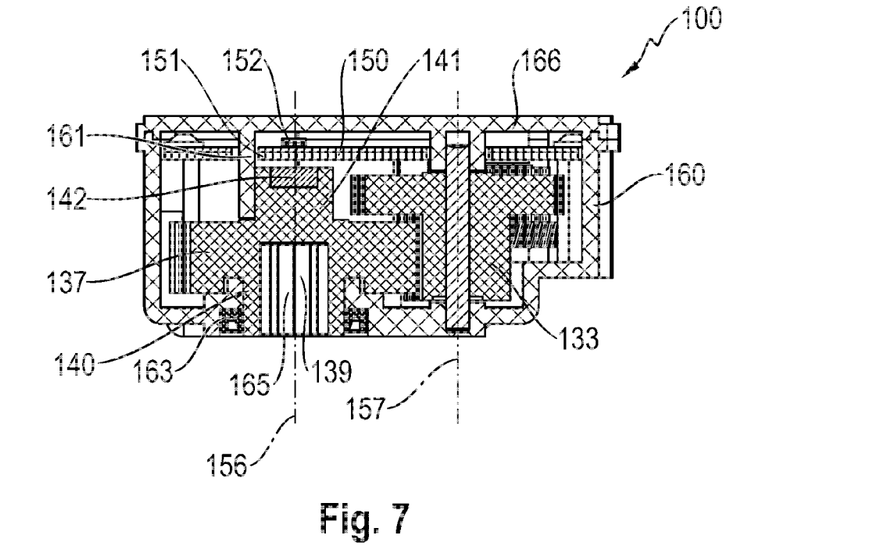
FIG. 7 shows a sectional view of an embodiment according to the invention.

FIG. 7 shows a sectional view of an embodiment according to the invention of the drive device 100. The drive device 100 including the control unit 150 is situated within the fluidically sealed housing 160, both being closed by the housing cover 166. The sectional view shows the first gear wheel 137 having the first gear wheel axle 156 which is assigned to the first gear wheel 137. The housing-proximal bearing 161 which is configured for holding the rotary slide output shaft 140 and thus the first gear wheel 137 extends from the housing cover 166. The housing-proximal bearing 161 herein extends through the contour 151 of the control unit 150. The sensor unit 152 which can detect the rotary position of the magnet 142 is disposed on the control unit 150. The magnet 142 is disposed on an end region of the rotary slide output shaft 140, 141, on account of which the position of a rotary slide (not shown) can be deduced from the rotary position of the magnet 142 by way of the rotary position of the rotary slide output shaft 140. A rotary slide can be fastened to a rotary slide interface 139 disposed on the rotary slide output shaft 140. The rotary slide output shaft 140 is sealed in relation to the housing 160 by means of the sealing element 163.

The second gear wheel 133 to which the second gear wheel axle 157 is assigned meshes with the first gear wheel 137. The first gear wheel axle 156 and the second gear wheel axle 157 of the gearbox 130 are disposed so as to be mutually parallel. The rotary slide output shaft 140 comprises the first gear wheel axle 156. The control unit 150 is aligned so as to be orthogonal to the first gear wheel axle 156 as well as to the second gear wheel axle 157.

Figure 8:
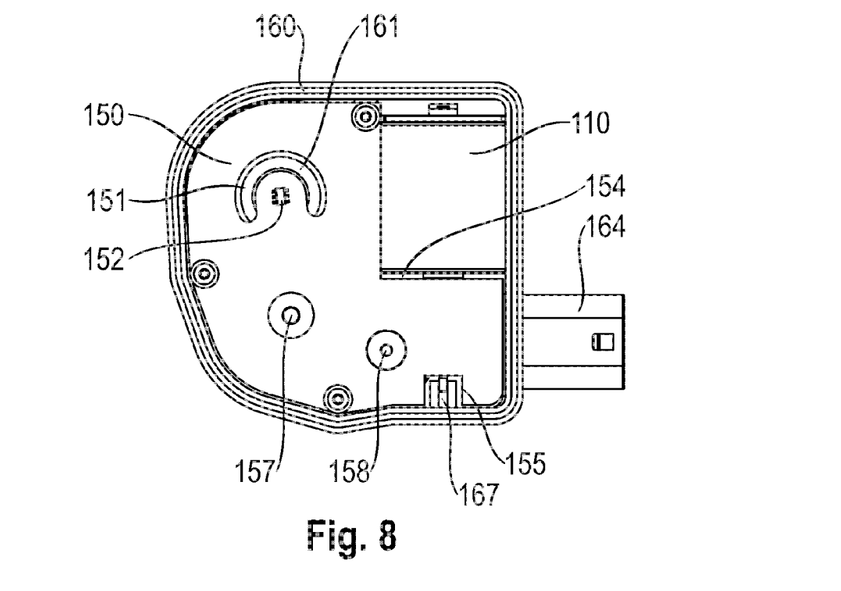
FIG. 8 shows a partial view of the drive device according to the invention.

FIG. 8 shows a partial view of the drive device 100 according to the invention in a plan view. The laterally disposed plug connector 164 is situated on the housing 160. The control unit 150 having the clearance 154 in which the electric motor 110 is incorporated is situated within the housing 160. The tongue-shaped housing-proximal bearing 161 extends through the contour 151. The sensor unit 152 is disposed on the control unit 150 so as to be within the contour. The second gear wheel axle 157 and the third gear wheel axle 158 can be additionally seen. A motor output shaft bearing 167 is shown in a further clearance 155 of the control unit 150.

| List of reference signs | |
|---|---|
| 100 | Drive device |
| 110 | Electric motor |
| 112 | Motor output shaft |
| 114 | Diameter |
| 130 | Gearbox |
| 131 | Third gear wheel |
| 132 | Gearbox input shaft |
| 133 | Second gear wheel |
| 134 | First bevel gear |
| 135 | Spur gear |
| 136 | Gearbox output shaft |
| 137 | First gear wheel |
| 138 | Second bevel gear |
| 139 | Rotary slide interface |
| 140 | Rotary slide output shaft |
| 141 | End region of rotary slide output shaft |
| 142 | Magnet |
| 150 | Control unit |
| 151 | Contour |
| 152 | Sensor unit |
| 154 | Clearance |
| 155 | Clearance |
| 156 | First gear wheel axle |
| 157 | Second gear wheel axle |
| 158 | Third gear wheel axle |
| 160 | Housing |
| 161 | Housing-proximal bearing |
| 162 | Interface |
| 163 | Sealing element |
| 164 | Plug connector |
| 165 | Housing opening |
| 166 | Housing cover |
| 167 | Motor output shaft bearing |
| R | Rotation axis |

The invention claimed is:

1. A drive device for activating a rotary slide for a fluid system of an at least in part electrically operated motor vehicle, the drive device comprising:
a housing;
an electric motor comprising a motor output shaft and arranged within the housing;
a rotary slide output shaft configured for activating a rotary slide and arranged within the housing and aligned so as to be orthogonal to the motor output shaft;
a magnet arranged on an end region of the rotary slide output shaft;
a sensor unit arranged within the housing and configured to detect a rotary position of the magnet and the rotary slide output shaft; and
wherein the sensor unit is arranged on a control unit;
wherein the rotary slide output shaft is held by means of a housing-proximal bearing configured to be tongue-shaped and arranged substantially on a side of the first gear wheel axle facing away from the second gear wheel axle; and
wherein the control unit is arranged between a face-proximal end of the rotary slide output shaft and the housing-proximal bearing.

2. The drive device according to claim 1, wherein the sensor unit is arranged axially spaced apart from the face-proximal end of the rotary slide output shaft.

3. The drive device according to claim 2, wherein the sensor unit is arranged on the control unit.

4. The drive device according to claim 2, wherein the rotary slide output shaft is held by means of the housing-proximal bearing.

5. The drive device according to claim 2, wherein
the drive device comprises a gearbox arranged and configured to transmit a torque of the motor output shaft to the rotary slide output shaft,
a first gear wheel axle and a second gear wheel axle of the gearbox are arranged in, and
the rotary slide output shaft comprises the first gear wheel axle.

6. The drive device according to claim 1, wherein:
the drive device comprises a gearbox arranged and configured to transmit a torque of the motor output shaft to the rotary slide output shaft,
a first gear wheel axle and a second gear wheel axle of the gearbox are arranged in parallel,
the rotary slide output shaft comprises the first gear wheel axle, and
the tongue-shaped bearing is a wall of a partial cylinder or a partial tube wall.

7. The drive device according to claim 1, wherein the housing-proximal bearing extends through a contour of the control unit.

8. The drive device according to claim 1, wherein the electric motor is a brushless stepper motor comprising axially disposed coils.

9. The drive device according to claim 1, wherein the sensor unit comprises a 3D Hall sensor.

10. The drive device according to claim 1, wherein the control unit is arranged orthogonal to the first gear wheel axle and to the second gear wheel axle.

11. The drive device according to claim 1, wherein the drive device and the control unit are arranged in a fluidically sealed housing.

12. The drive device according to claim 11, wherein the housing comprises a bulkhead arranged and configured to fluidically seal the control unit and the electric motor in relation to a housing portion that is able to be passed through by a fluid flow.

13. The drive device according to claim 1, wherein the drive device comprises an interface configured to connect to an external control apparatus.

14. The drive device according to claim 1, wherein the gearbox is configured to run wet.

* * * * *